June 7, 1932. D. A. McCOWAN 1,862,190
AUTOMATIC PHOTOGRAPHING MACHINE
Filed Jan. 3, 1928 6 Sheets-Sheet 1

Inventor.
David A. McCowan.

June 7, 1932. D. A. McCOWAN 1,862,190
AUTOMATIC PHOTOGRAPHING MACHINE
Filed Jan. 3, 1928   6 Sheets-Sheet 2

Inventor.
David A. McCowan.

June 7, 1932. D. A. McCOWAN 1,862,190
AUTOMATIC PHOTOGRAPHING MACHINE
Filed Jan. 3, 1928 6 Sheets-Sheet 3

Inventor.
David A. McCowan.

June 7, 1932. D. A. McCOWAN 1,862,190
AUTOMATIC PHOTOGRAPHING MACHINE
Filed Jan. 3, 1928 6 Sheets-Sheet 4

Inventor:
David A. McCowan.

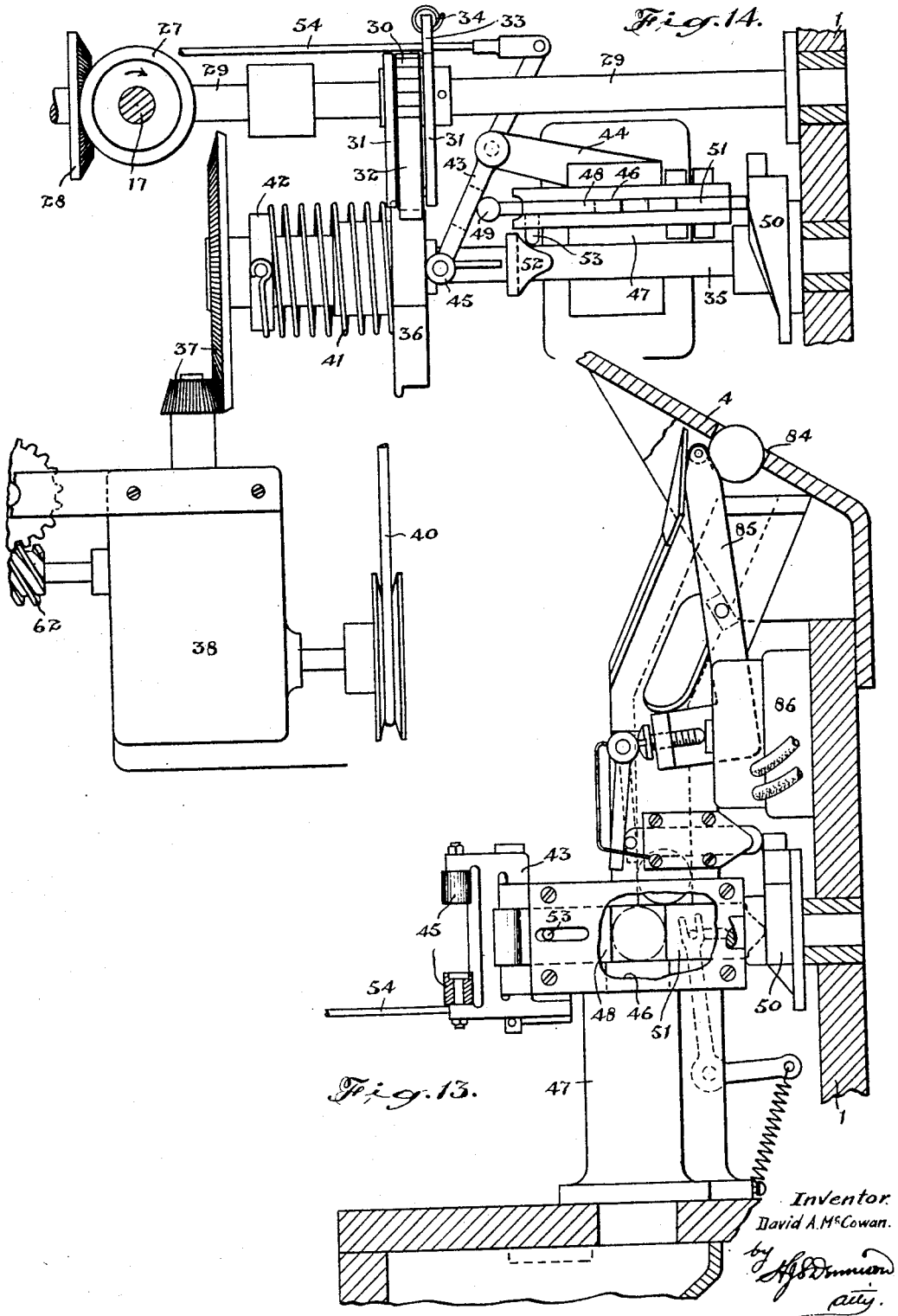

June 7, 1932. D. A. McCOWAN 1,862,190
AUTOMATIC PHOTOGRAPHING MACHINE
Filed Jan. 3, 1928 6 Sheets-Sheet 6

Inventor.
David A. McCowan.

Patented June 7, 1932

1,862,190

UNITED STATES PATENT OFFICE

DAVID A. McCOWAN, OF TORONTO, ONTARIO, CANADA

AUTOMATIC PHOTOGRAPHING MACHINE

Application filed January 3, 1928. Serial No. 244,267.

The principal objects of this invention are, to devise a machine for producing novelty photographs which will operate automatically and deliver a finished picture in a very brief period.

A further object is to devise a mechanism of simple and durable construction which will be very reliable in its operation and may be produced at reasonable cost.

The principal feature of the invention consists in the novel construction and arrangement of parts, whereby individual sensitized discs are fed automatically to a position behind the lens to receive an exposure and following the operation of the lens shutter are subjected to the action of a photographic developer followed by a washing and drying operation.

In the drawings, Figure 1 is a side elevational and part sectional view of a cabinet showing the arrangement of the automatic mechanism therein.

Figure 13 is a vertical part sectional enlarged detail elevation of the coin receiving and operating mechanism.

Figure 14 is an enlarged plan view of the coin controlled operating part of the operating mechanism.

Figure 1:
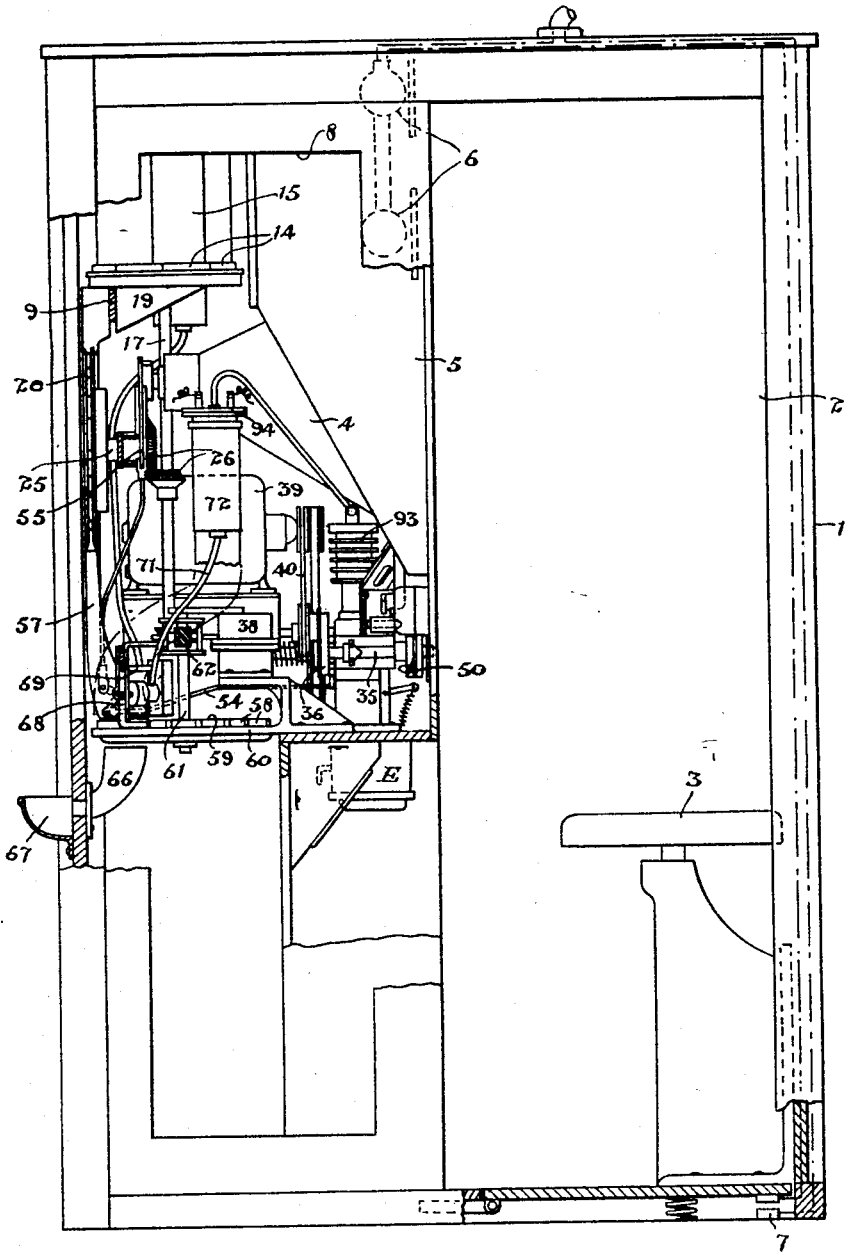
Figure 2:
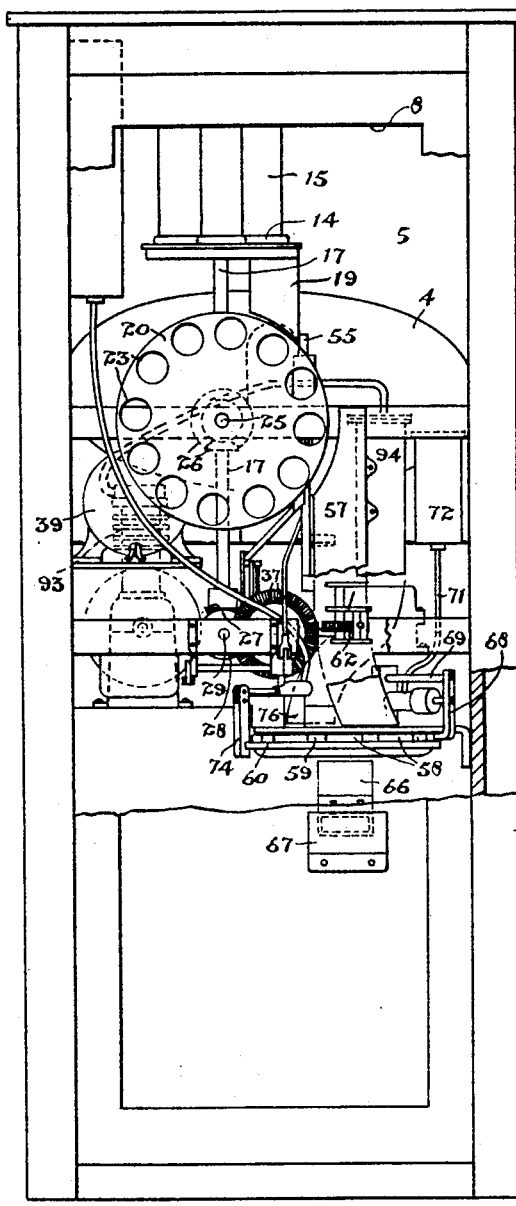
Figure 2 is an elevational view from the rear of the cabinet showing the arrangement of the mechanism therein.
Figure 3:
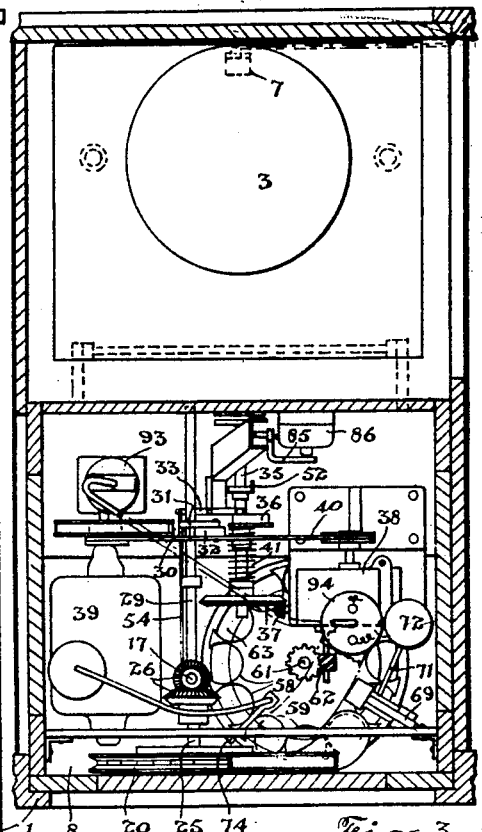
Figure 3 is a transverse sectional view through the line 3—3 of Figure 1.
Figure 4:
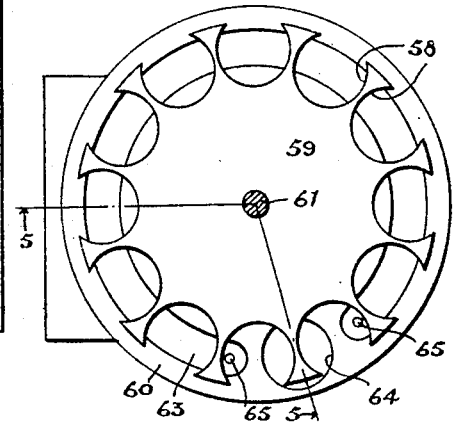
Figure 4 is an enlarged plan view of the member for holding the discs during the developing, washing and drying operations.
Figure 5:
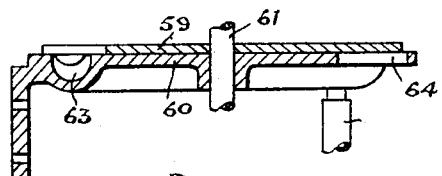
Figure 5 is a vertical sectional view on the line 5—5 of Figure 4.
Figure 6:
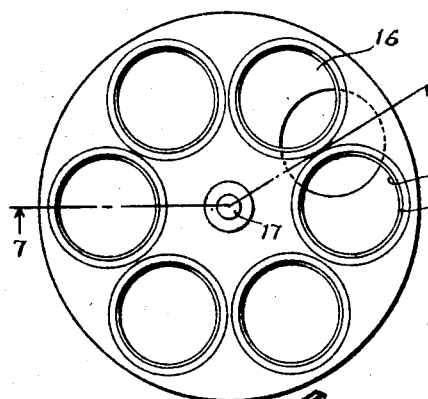
Figure 6 is a plan view of the magazine for carrying the discs.
Figure 7:
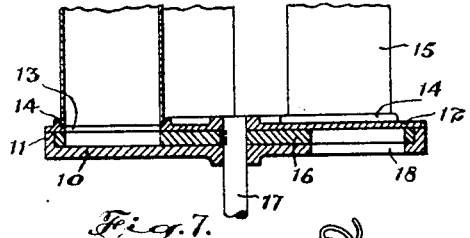
Figure 7 is a vertical sectional view through the base of the magazine through the line 7—7 of Figure 6.
Figure 8:
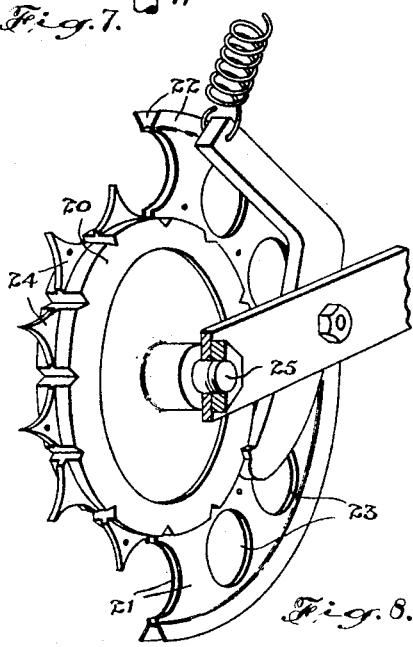
Figure 8 is an enlarged perspective sectional detail of the rotatable member for holding the sensitized discs in alignment with the lens and for delivering them to the finishing mechanism.

Cabinet automatic photograph machines are coming extensively into use and the invention herein disclosed provides a very attractive automatic device which will produce excellent photographs on souvenir discs in a very effective and rapid manner and is incorporated in a compact readily transportable cabinet.

In the construction herein illustrated the cabinet 1 is provided with a chamber 2 into which the person to be photographed enters and when seated upon a stool 3 the person's head and shoulders will be in the proper position opposite the converging portion 4 of the light reflector 5 back of which the lens is located.

Suitable lamps 6 are arranged in the upper part of the reflector 5 and these are preferably connected with a switch 7 arranged in the floor of the cabinet so that the lights are automatically switched on when the person steps into the cabinet.

Back of the chamber 2 is arranged a chamber 8 in which are located the various devices required to handle the sensitive plates used in making the photograph.

At the upper part of the chamber 8 supported upon the brackets 9 is a circular table 10 which is formed with an upright edge flange 11 and the top 12 is provided with a plurality of circular openings 13 each of which is surrounded by a flange 14.

Container cartons 15 of cylindrical form are placed on the flanges 14. These contain the novelty discs which are provided with a sensitive surface to receive a photographic impression.

Between the top 12 and table 10 is a rotatable disc 16 which has a plurality of circular orifices corresponding with the openings 13 in the top. The depth of the disc 16 is slightly greater than the thickness of the novelty discs so that as the disc 16 is rotated, the orifice therein will receive a disc from any one of the cartons.

A vertical shaft 17 is journalled in the table 10 and is secured to the disc 16 to rotate it.

A circular opening 18 in the table 10 communicates with a chute 19 and the novelty discs are directed into this chute one at a time and the chute is so shaped as to turn the discs to a vertical position.

Arranged adjacent to the bottom of the chute 19 is a rotatable wheel 20 which is formed of a pair of spaced flanges 21 which have flaring outer edges 22, said flanges being provided with a plurality of spaced openings 23 and between the flanges 21 are arranged curved blocks 24 which form pockets to receive the novelty discs.

The wheel 20 is mounted on a shaft 25 which is connected with the vertical shaft 17 by a pair of bevelled gears 26.

The rotation of the shaft 25 is thus in unison with the rotation of the disc 16 secured to the shaft 17 which delivers the photographic discs to the chute 19.

The vertical shaft 17 is provided with a bevelled gear 27 at its lower end which meshes with the bevelled gear 28 on the horizontally journalled shaft 29.

The shaft 29 has mounted thereon a ratchet wheel 30 and rotatably mounted each side of the ratchet wheel is an arm 31.

Between the outer ends of the arms 31 is pivotally mounted a pawl 32 which engages the ratchet wheel 30.

An extension 33 from one of the arms 31 has connected thereto a coil tension spring 34 which spring is connected at its other end to a rigid part of the frame.

A shaft 35 arranged parallel with the shaft 29 has slidably mounted thereon a cam 36 which is adapted to co-operate with the pawl 32.

The shaft 35 is driven through a pair of bevelled gears 37 and a speed reduction gear 38 from a suitable electric motor 39 through a suitable belt connection 40.

A spiral spring 41 encircling the shaft 35 is secured at one end to a fixed collar 42 and the other end bears against the cam 36 and normally holds said cam in a position out of contact with the pawl 32.

An arm 43 pivotally mounted intermediate of its length on a fixed bracket 44 is provided with a jaw end which straddles the shaft 35 and has rollers 45 mounted thereon to engage the flat face of the cam.

A guide-way 46 formed between the rigid plates supported on a suitable standard 47 has a slide 48 mounted therein which is provided with a round end 49 to engage the arm 43 to swing it on its pivot.

A cam 50 mounted on the shaft 35 engages a slidable member 51 which co-operates with the slide 48 when a coin is inserted therebetween to move the slide 48 longitudinally so as to engage and swing the arm 43 on its pivot which in turn moves the cam 36 into the same plane as the pawl 32.

A cam block 52 is rigidly mounted on the shaft 35 and is adapted to engage a pin 53 secured to the slidable member 48 to return said slidable member to its normal position.

It will be understood that as the cam 36 rotates with the shaft 35 it swings the pawl 32 upwardly, pivoting on the supporting arms 31 and the point of the pawl engaging the ratchet wheel 30 rotates the shaft 29. This movement continues to the limit of the eccentric cam and then ceases. The partial revolution thus effected rotates the shaft 35 and through its bevelled gears 28 it rotates the vertical shaft 17 sufficiently far to turn the table 10 the distance between two of the openings therein and effect the delivery of one of the photographic discs into the chute 19.

Simultaneously with the operation of the arm 43 to move the cam into alignment with the pawl 32 a rod 54 connected with the arm operates through a series of connections a slidable member 55 which operates a shutter arm 56 of the lens, thus effecting the exposure of the photographic disc arranged in the wheel 20.

The rotation of the cam 36 then effects the movement of the pawl to turn the vertical shaft and also to rotate the wheel 20 so that said wheel moves to a position to discharge the exposed disc into a chute 57 which carries the disc downwardly and delivers it in a horizontal position into one of the part circular notches 58 formed in the wheel 59 arranged over a table 60.

The wheel 59 is secured to a shaft 61 which extends upwardly and is driven by a worm wheel and worm speed reduction gear 62 which is operated from the main speed reduction box 38.

The table 60 is rigidly supported in the cabinet and is provided with a groove 63 in the surface thereof which extends from either side of a circular opening 4.

The ends of the groove each have openings 65 leading therefrom which are connected to a suitable drain pipe.

The opening 64 connects with a discharge chute 66 which directs the finished photograph to a delivery receptacle 67 arranged on the outer side of the cabinet.

When the exposed disc is delivered by the wheel 20 into the chute 57, the chute conducts the disc downwardly and places it horizontally into one of the notches 58 in the wheel 59 with the exposed photographic surface upward.

The wheel 59 rotates slowly and the edge of the photographic disc projecting beyond the open side of a notch of the wheel engages an arm 68. This arm is pivotally mounted on a rigid support 69 and is connected to the stem of a valve 70.

The valve 70 closes a tube 71 leading from a reservoir 72 which is filled with a suitable developing fluid and a short tube 73 extends from the valve 70 and discharges the developer onto the upper surface of the exposed disc. The action of the valve is momentary, but sufficiently long to direct the required quantity of developer onto the disc and the valve is closed by means of a spring.

As the wheel 59 continues its rotative movement, the edge of the disc over which the developer has been discharged moves into contact with the arm 74 which operates the spindle of a spring closed valve 75 leading from a water supply.

The lower end of the valve chamber is preferably provided with a closed receptacle 76 which fills up while the valve 75 is open and the water continues to flow after the valve is closed through the spout 77 at the bottom of the receptacle.

An air nozzle 78 is arranged adjacent to the discharge end of the spout 77 and directs a stream of air across said nozzle, blowing the water in a fine spray from the end of the spout and distributing it over the surface of the disc in such a manner as to wash the developer therefrom.

The developer and water thus washed off the disc is carried away by the drain groove in the table 60.

The continued movement of the wheel 59 after the spraying of the disc carries the washed disc beneath a tube 79 which leads from the blower 80.

The air from the blower is directed through a heating chamber 81 in which is located a suitable heating element 82.

A small air tube 83 leads from the tube 79 of the blower, conducting a supply of air to the nozzle 78 previously described.

A blast of heated air directed from the blower 80 through the tube 79 against the surface of the washed disc blows the water from the surface and thoroughly dries it before the complete disc is delivered into the opening 64 leading to the discharge tube 66.

It will be understood that a machine such as described may be operated by a manually operated lever which may be controlled by a suitable coin controlled device, but it is preferable to operate the entire mechanism by the insertion of a coin and while the details of the coin receiving device are not important, the coin itself on being inserted through the coin slot 84 in the casing swings the lever 85 on its pivot to engage and operate an electric switch 86.

The switch 86 when thus operated opens a circuit A through the electro-magnet B of a time relay switch C which is of a standard make. The time relay C is reset on the breaking of the circuit through the magnet B and as the coin passes the lever 85, the switch 86 is again closed, thus closing the circuit through the magnet B.

Immediately upon the automatic return of the time controlled relay, said relay closes the electric circuit D to the motor 39 from the main switch E and the motor operates the cam for operating the feed mechanism and it also operates the mechanism for turning the developing, washing and delivering wheel as also it operates the blower.

Figure 17:
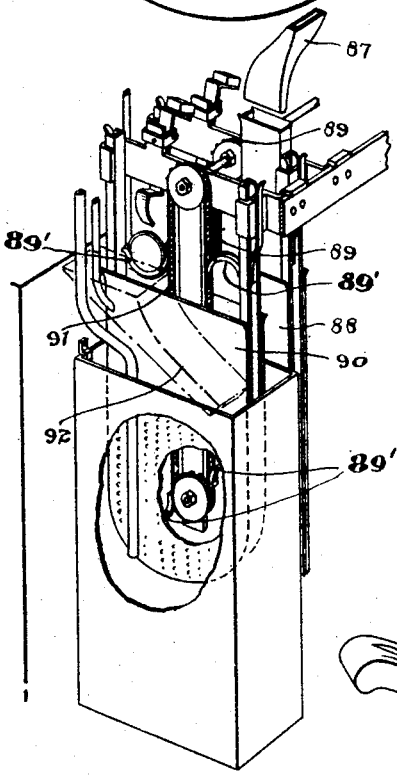
Figure 17 is a perspective view shown partly broken away of a modified arrangement of means for developing and washing the discs.
Figure 18:
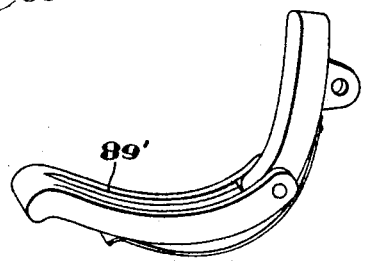
Figure 18 is a perspective detail of one of the disc carrying members of the mechanism shown in Figure 17.
Figure 16:
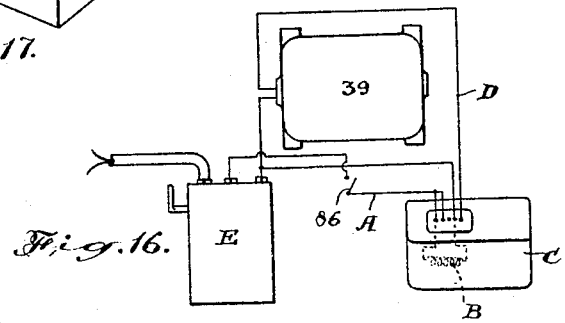
Figure 16 is a diagram showing the arrangement for wiring the apparatus.
Figure 10:
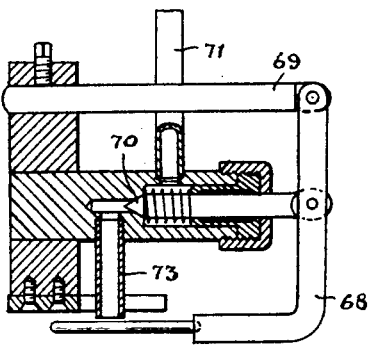
Figure 10 is an elevational section of the means for delivering the developing fluid onto the exposed sensitized disc.
Figure 11:
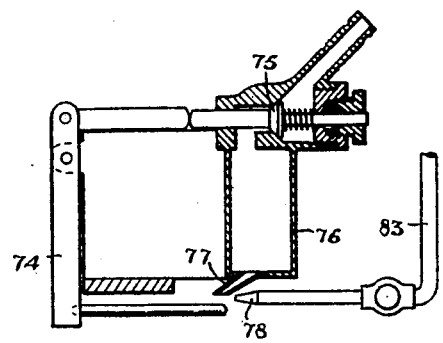
Figure 11 is an elevational sectional detail illustrating the means for washing the discs.

It will be readily understood that various changes may be made in the details of the mechanism of a device of this kind and it may be found desirable to dip the exposed discs and in Figure 17 I show a chute 87 leading from the feed mechanism to a developer tank 88.

In this developer tank is arranged an endless conveyor 89 in the form of a chain belt provided with arc-shaped fingers 89' which will pick up the discs and return them to the top from whence they are discharged into a washing tank 90 which also contains an endless conveyor 91.

The discs when passed through the washing tank are directed into a delivery chute 92 from whence they may be carried to a drying apparatus such as described.

Figure 12:
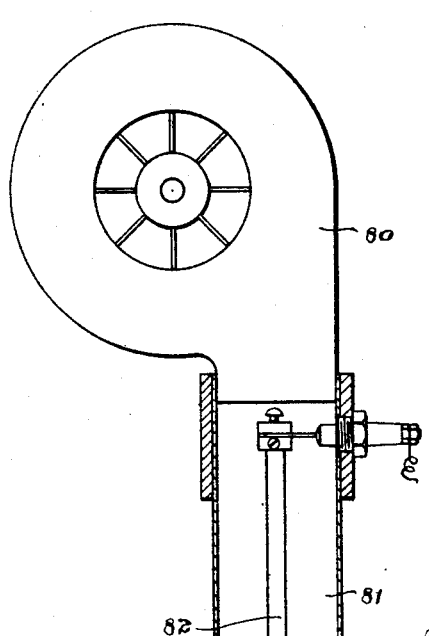
Figure 12 is a sectional detail of the means for drying the discs after they are washed.
Figure 9:
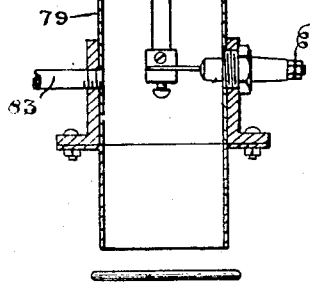
Figure 9 is an elevational detail of the shutter device and its operating arm.
Figure 15:
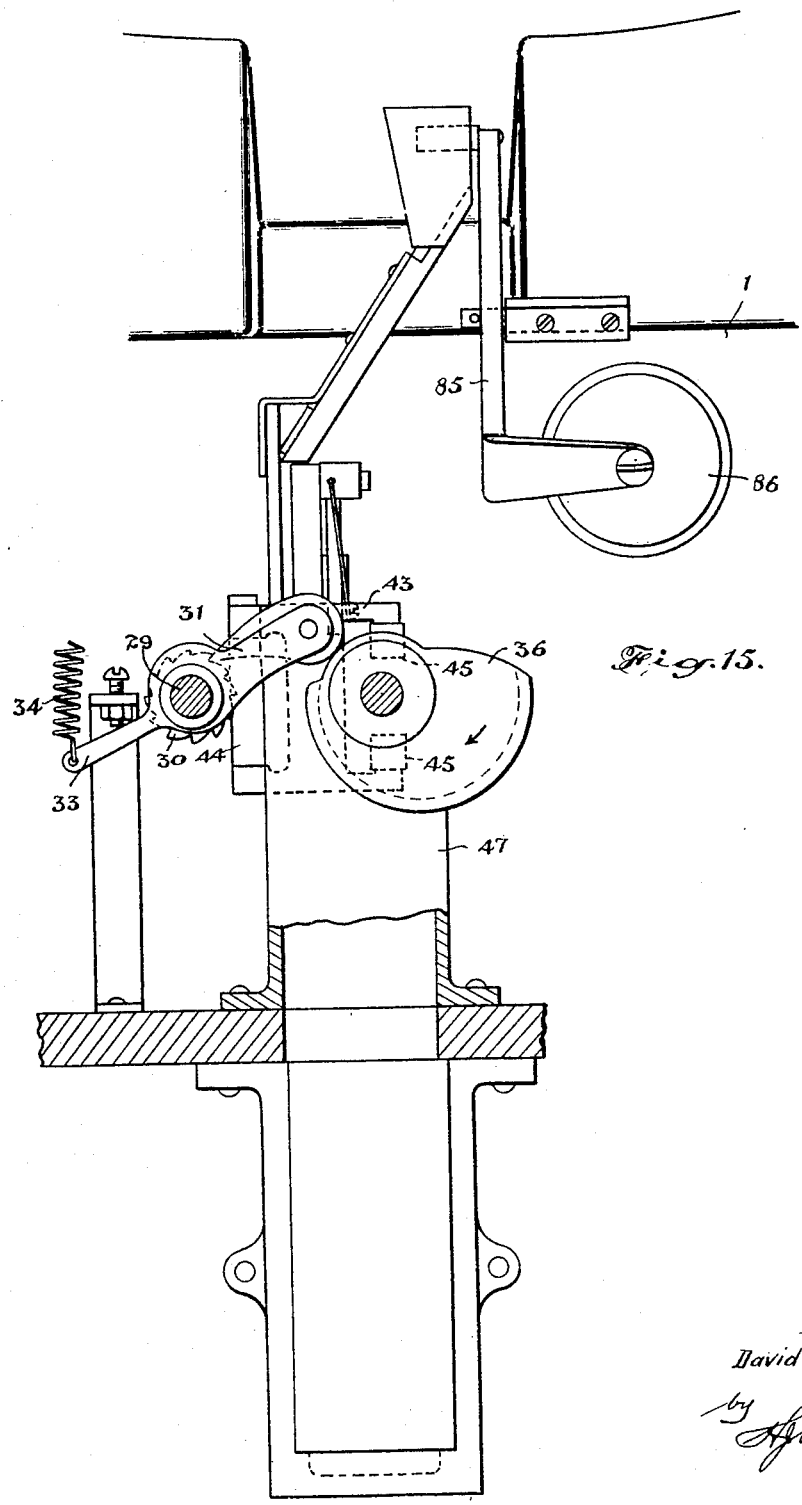
Figure 15 is an elevational detail of a portion of the coin-controlled operating mechanism.

In Figure 12 I have shown a blower of the rotary type for directing air through a heating chamber to the discharge nozzle but I may find it desirable to use a small air compressor as indicated by the numeral 93 in Figure 1.

The discharge from the compressor is shown directed to a heating chamber 94 which corresponds with the heat chamber 81 shown in Figure 12.

In the use of a machine such as described the person desiring a novelty photograph therefrom steps into the cabinet and by doing so immediately closes the switch operating the lights and upon the insertion of the proper coin into the coin chute the machine is started into operation. The first insertion of the coin operates the cut-out switch 86, thus starting the time limit relay and starting the motor into operation. Accordingly with the starting of the electrical device the coin is directed between the slide members 48 and 51 and upon the rotation of the shaft 35 the cam 50 thereon moves the slide members to operate the lever 43 and accordingly operates the shutter.

It will be noted that the coin performs an active function in the operation of the shutter as well as starting the device, but the coin control feature may be dispensed with and the slide member may operate directly to manipulate the shutter and to throw the cam 36 into operative engagement with the pawl 32. The operation of the pawl in the moving of the feed mechanism has already been described.

It will be readily appreciated that the whole mechanism is very compact and is comparatively simple in its operation. There are no delicate parts to get out of order and the novelty discs are used as an important factor in the operation.

What I claim as my invention is:—

1. In an automatic photographing machine, the combination with a lens, a storage magazine, and means for releasing sensitized members from said magazine, of means operating in a fixed plane for receiving said members and supporting the same in alignment with said lens, means for exposing the sensitized member through said lens, said operating means being adapted following the exposure of said sensitized member to carry same beyond the lens, means for developing and drying the sensitized surface of the exposed sensitized member, and means for discharging said developed sensitized member from said machine.

2. In an automatic photographing machine adapted to contain a supply of individually sensitized members the combination of, a lens, a carriage member operating in a fixed vertical plane behind said lens adapted to receive and support the sensitized members in alignment with the lens and carry same therebeyond, means for directing said members individually to said carriage member, means for exposing said members through said lens, and means for developing, washing and drying said exposed members.

3. In an automatic photographing machine, the combination with a lens, means for conducting a sensitized member into alignment with said lens and means for exposing said sensitized member through said lens, of a conveyor operating in a fixed plane adapted to convey said exposed member from alignment with said lens, spray means directed toward said sensitized member when in said conveying means, said spray being actuated to spray a developing fluid onto said sensitized member, means for drying said member, and means to discharge the completed photograph from said machine.

4. In an automatic photographing machine, the combination with a lens, a shutter therefor and a magazine for containing a supply of individually sensitized members, of cam controlled motor driven means for individually conveying said sensitized members into alignment with said lens, motor driven means, cam controlled ratchet means interposed between and adapted to operatively connect said motor driven means with said conveying means to effect the operation of the latter, cam controlled mechanism for operating said shutter when said sensitized member is in alignment with said lens, cam controlled, motor driven mechanism for conveying the exposed sensitized member to a developing mechanism, motor driven mechanism for developing said exposed sensitized member, drying means for drying said sensitized member, and discharge means for discharging said developed member upon the completion of the driving operation.

5. In an automatic photographing machine, the combination with a lens, a shutter therefor, and a magazine for containing a supply of photographically sensitized members, of rotatable means for holding said photographically sensitized members in alignment with said lens, means for transferring one of said sensitized members to said holding means upon one actuation of the mechanism, shutter actuating means to open said shutter upon the succeeding operation of the mechanism to expose the previously transferred sensitized member in said holding means, a developing table and means for transferring said sensitized member from said holding means to said developing table after the operation of said shutter.

6. In an automatic photographing machine, the combination with a lens, a shutter therefor, a magazine for containing a supply of photographically sensitized members and means for holding a photographically sensitized member in alignment with said lens, of means for individually transferring one of said sensitized members to said holding means during one operation of the machine, shutter actuating means to open said shutter upon the transferring of a second sensitized member to said holding means to expose the previously transferred sensitized member, means for discharging said first transferred exposed sensitized member from said holding means upon the actuation of said shutter on the second operation of said machine, developing and drying mechanism mounted adjacent said holding means, and means to receive said discharged exposed member and to transfer same to said developing and drying means.

7. In an automatic photographing machine, means for automatically exposing and developing a sensitized member, said means including a holder member rotatable in a fixed plane and having a pair of flanges spaced apart to receive individual photographically sensitized members therebetween, a plurality of positioning members mounted between said flanges to hold said photographically sensitized members in a position between said flanges, one of said flanges having an aperture to expose a face of said sensitized member when in position therein.

8. In an automatic photographing machine, the combination with a lens, a shutter therefor, a magazine for holding a plurality of photographically sensitized members and means for holding said sensitized members in alignment with said lens, of feed means for individually feeding said sensitized members from said magazine to said holding means upon each actuation of the mechanism, means for operating said shutter upon the completion of a succeeding feeding operation to expose the sensitized member fed during a previous operation of the machine, means for discharging said exposed member from said holding means, a developing mechanism, means for transferring said discharged member to said developing mechanism, and time controlled motor driven mechanism for successively actuating the mechanisms for each stage of a photographic process.

9. In an automatic photographing machine, means for automatically exposing and developing a sensitized member, said means including a rotatable feed member having a pair of flanges spaced apart to receive individual photographically sensitized members therebetween, one of said flanges having an exposure opening to align with the lens, and a plurality of curved positioning members mounted between said flanges to hold said photographically sensitized members in position between said flanges opposite said opening.

10. In an automatic photographing machine, the combination with the lens of a magazine for holding photographically sensitized members, cam-actuated ratchet feed means to feed said sensitized members to a position in alignment with said lens, cam-actuated means mounted to expose said photographically sensitized members when in alignment with said lens, mechanism operated by said cam-actuated ratchet feed means mounted to convey said photographically sensitized member from position in alignment with said lens to a developing compartment, and means for developing the exposed member.

11. In an automatic photographing machine, the combination with a lens, of a rotatable carriage member arranged back of the lens and adapted to receive individual photographically sensitized members and support the same in alignment with the lens and adapted to carry said members after exposure transversely of the lens axis to a position beyond the lens, means for feeding said sensitized members to said rotatable carriage member, means for conducting the exposed sensitized members from said rotatable member on being carried thereby to the position beyond the lens, means for developing said exposed members, means for washing said developed members, and means for delivering the completed photograph from the machine.

12. In an automatic photographing machine, the combination with a lens, of a movable carriage member arranged back of the lens and having a plurality of holders adapted to receive individual photographically sensitized members and support the same in alignment with the lens and adapted to carry said members after exposure transversely of the lens axis to a position beyond the lens, a magazine for containing a supply of photographically sensitized members, means for feeding said members from said magazine to the pockets of the aforesaid movable carriage member, means for actuating said movable carriage and feeding means in unison, means for individually exposing the sensitized member through the lens, means for conducting the exposed member from said movable carriage member on being carried thereby to the position beyond the lens, means for developing and washing the exposed member, and means for delivering the completed photograph.

13. In an automatic photographing machine, the combination with a lens, of a movable carriage member arranged back of the lens and having a plurality of spaced holders each adapted to receive an individual photographically sensitized member and support the same in alignment with the lens and adapted to carry said members after exposure transversely of the lens axis to a position beyond the lens, a magazine mounted in a fixed position adapted to hold a stack of individual photographically sensitized members, a rotatable feeding member arranged below said fixed magazine adapted on rotation to remove one sensitized member at a time from the bottom of the stack, a chute adapted to receive the sensitized members as they are removed from the stack and place them in said movable carriage which is adapted to support the sensitized members in alignment with the lens, means for operating the lens shutter, means for operating said movable carriage and rotatable feeding member in unison, means for conducting the exposed sensitized members from the movable carriage, means for developing and washing the exposed members, and means for delivering the completed photographs.

14. In an automatic photographing machine, the combination with a lens, of a vertically arranged magazine adapted to contain a stack of individual sensitized members, a disc rotatably arranged below said holder and having an opening therein adapted to receive one of the sensitized members at a time, a shaft extending vertically from said disc, a wheel arranged in a vertical plane and mounted on a horizontal shaft, said wheel having pockets in its periphery and openings to expose the sensitized faces of the members held in said pockets, bevelled gears mounted on said shafts and operating them in unison, means for rotating the vertical shaft, means for operating the shutter of the lens to expose the sensitized member held in alignment therewith, means for conducting the said exposed members from said wheel, means for developing and washing the exposed members in transit after leaving said wheel, and means for delivering said members.

15. In an automatic photographing machine, the combination with a lens and means for conducting individual photographically sensitized members past said lens to be exposed and means for exposing the sensitized members through the lens, of a holding member operating in a fixed plane adapted to receive the exposed members as they are carried beyond said lens, means for developing the photographic surface of said members during the movement of the holding member in its fixed plane, means for washing the developer from said sensitized members, and means for drying said members.

16. In an automatic photographing machine, the combination with a lens and means for conducting individual photographically sensitized members past said lens to be exposed and means for exposing the sensitized members through the lens, of a holding member operating in a fixed horizontal plane having a plurality of pockets therein, a conveyor adapted to convey the exposed members to said pockets as they are carried beyond said lens by said carrying means, means for directing a developing fluid on to the members deposited in said pockets, means for washing the developer from said surface of the sensitized member during the operation of the holding member, means for drying the sensitized member during the operation of said holding member, and means for delivering the dried member.

17. In an automatic photographing machine, the combination with a lens, means for conducting individual photographically sensitized members past said lens and means for exposing the sensitized members through the lens, of a member having a plurality of pockets therein, a conveyor adapted to convey the exposed members to said pockets, a developer reservoir, a nozzle connected with said reservoir and adapted to direct a developing fluid on to the exposed sensitized members held in said pocket member, a valve controlling said nozzle, means connected with said valve and operated by the passage of the sensitized member to open said valve, a water supply a nozzle connected with the water supply and directing water on to the sensitized member, a valve controlling the discharge of water from the nozzle, means operatively connected with said valve and actuated by the passage of the sensitized member to open the water valve, means for drying the washed sensitized member, and means for delivering the said member.

18. In an automatic photographing machine, the combination with a lens, means for conducting individual photographically sensitized members past said lens and means for exposing the sensitized members through the lens, of a horizontally arranged rotatable member having notches opening through the periphery, means for conducting the exposed sensitized members from said former conducting means and directing them into the notches of said rotatable member, a supply tank of developing fluid, a valve connected with said supply tank, a nozzle adapted to direct developing fluid on to the surface of the sensitized member, a lever connected with the valve and adapted to be operatively engaged by the rim of the sensitized member in its movement with the horizontal rotatable member, spring means for closing said valve following the disengaging of the sensitized member from the said lever, a water supply, a valve, a lever controlling said valve adapted to be engaged by the sensitized member to direct a flow of water thereover, and means for drying the sensitized member following the washing thereof.

19. In an automatic photographing machine, the combination with a lens, means for conducting individual photographically sensitized members past said lens, and means for exposing said sensitized members through the lens, of a rotatable member operating in a fixed horizontal plane and having notches opening through the periphery, a chute conducting the exposed sensitized members from said former conducting means and directing them into the notches of said rotatable member, means actuated through contact with the exposed sensitized members as the latter are carried by said rotatable member for directing the developing fluid onto the exposed surface of said members, means actuated by contact with said members as the latter are carried by said rotatable member for washing said members, means for directing a flow of air against said members in their path of movement while arranged in said rotatable member, and means for heating said air.

20. In an automatic photographing machine, the combination with a lens and means for conducting individual photographically sensitized members past said lens and means for exposing the sensitized members through the lens, of a rotatable member operating in a fixed horizontal plane adapted to receive the exposed members, means for directing a developing fluid to the exposed surface of the sensitized members, a water supply, a nozzle adapted to direct water to the developed surface of said sensitized member to wash the same, an air pressure supply, an air nozzle connected with said air pressure supply adapted to direct a jet of air across the water nozzle to blow the water in a spray over the developed sensitized surface, means for directing a forced flow of air against the washed surface of said members, and means for heating the latter flow of air, all of said operations taking place while the exposed members are being carried by said rotatable member.

21. In an automatic photographing machine, a lens, a storage supply of individually sensitized members, means for releasing said members individually, means for conducting said released members to said lens, means for exposing the sensitized members through the lens, means for conducting the exposed members from the lens, rotatable means interposed between said first and second-mentioned conducting means for carrying the exposed members from the lens and depositing same in said second-mentioned conducting means, means for developing, washing and drying said exposed members, mechanism adapted to operate said releasing and rotatable means, time controlled mechanism connected with said operating mechanism, and manually operated means for starting said time controlled mechanism.

22. In an automatic photographing machine, the combination with an electric motor, a lens, means for automatically feeding photographically sensitized members back of said lens, means for exposing the sensitized member through the lens, means for finishing the exposed sensitized members, and means operatively connected with said electric motor for operating the aforesaid means, of a time controlled relay electrically connected with said motor, a cut out switch connected with said relay adapted to de-magnetize the relay to cause its return to its operative position and to effect the starting thereof, and a lever adapted to temporarily open said switch to effect the resetting of the relay.

23. In an automatic photographing machine, the combination with the lens, means for feeding photographically sensitized members to be exposed through said lens and means for exposing said sensitized members, of a motor driven mechanism, time controlled means for operating said mechanism a fixed distance each operation of the machine, manually controlled means adapted to operatively connect said motor driven mechanism with the means for conveying the photographically sensitized members past said lens, and means for developing the exposed sensitized members.

24. In an automatic photographing machine, the combination with the lens, means for feeding photographically sensitized members to be exposed through said lens and means for exposing said members, of a motor driven mechanism, time-controlled means for operating said mechanism a fixed distance each operation of the machine, a cut out switch electrically connected with said time controlled mechanism, manually operated means for operating said time controlled mechanism, and means operated by said motor driven mechanism for finishing the exposed sensitized members.

25. In an automatic photographing machine, the combination with a lens and means for feeding photographically sensitized members to be exposed through said lens, of a shaft operatively connected with said feeding means, a shaft operatively connected to rotate the aforesaid shaft, a ratchet mechanism mounted on the latter shaft, a shaft arranged adjacent to the ratchet bearing shaft, a cam axially adjustable on the latter shaft and adapted to be moved thereon into or out of operative alignment with said ratchet mechanism and adapted to operate the latter when in the aligned position, a member adapted to engage said cam to move it into operative alignment with said ratchet to effect the rotation of the shaft on which the latter is mounted, manually operated means for operating the aforesaid cam operating member, means connected with the cam operating member for operating the shutter of the lens coincident with the operation of the manually operated lever, an electric motor operatively connected with the cam shaft, and means operated by said manually operated means for controlling the operation of the motor.

26. In an automatic photographing machine, the combination with a lens, a shutter for the lens, means for operating said shutter, a magazine for holding a supply of photographically sensitized members and means for feeding said sensitized members from said magazine, of rotatable means operating in a fixed plane for holding said sensitized members one at a time in alignment with said lens, means for conducting said sensitized members from said rotatable holding member after being exposed, means for finishing said sensitized members, a motor operatively connected with said feeding, holding and finishing means, automatic means for controlling the operation of the motor, and means operated by said manually operated means for operating the shutter adapted to actuate said motor control means.

27. In an automatic photographing machine, in combination, means for feeding photographically sensitized members to be exposed, means for exposing said sensitized members, a motor driven mechanism co-operating with said feeding means, time-controlled means for actuating said mechanism a predetermined period of time for each operation of the machine, manually controlled means to start said motor driven mechanism and said time-controlled means, and means to reset said time-controlled means during the operation of said motor driven mechanism.

28. In an automatic photographing machine, the combination with a lens, a storage magazine, and means for releasing sensitized members from said magazine, of rotatable means operating in a fixed plane for moving said members individually past the lens to be exposed, means for exposing the sensitized members through said lens, means for developing and drying the sensitized surface of the exposed sensitized member, and means for discharging the developed sensitized member from the machine.

DAVID A. McCOWAN.